United States Patent [19]

Schaars

[11] Patent Number: 4,968,105
[45] Date of Patent: Nov. 6, 1990

[54] COMPOSITE SECTION

[75] Inventor: Petrus T. J. Schaars, Helvoirt, Netherlands

[73] Assignee: SDB Industries B.Y., Netherlands

[21] Appl. No.: 325,550

[22] Filed: Mar. 20, 1989

[30] Foreign Application Priority Data

Mar. 22, 1988 [NL] Netherlands .................... 8800706

[51] Int. Cl.$^5$ ................................................ A47F 3/00
[52] U.S. Cl. ................................. 312/140; 312/265.3; 312/265.4
[58] Field of Search ............... 403/231; 312/140, 283, 312/265.1, 265.2, 265.3, 265.4

[56] References Cited

U.S. PATENT DOCUMENTS

| 1,199,357 | 9/1916 | Evans | 312/140 X |
| 2,344,161 | 3/1944 | Michaels | 312/140 |
| 2,942,924 | 6/1960 | Stangert | 312/140 X |
| 3,477,182 | 11/1969 | Fulton | 312/140 X |
| 4,385,850 | 5/1983 | Bobath | 403/231 X |

FOREIGN PATENT DOCUMENTS 586832  6/1931  Fed. Rep. of Germany ...... 312/140

Primary Examiner—Joseph Falk

[57] ABSTRACT

A composite section for manufacturing a case, in particular a show-case, is described. Two identical, generally L-shaped glass panel receiving sections (13, 13') are placed in mirror-symmetrical relationship with the apices away from one another. The legs of the L have flanged edges (16, 17) defining an angle of at least 90°. The sections (13, 13') are interconnected by two cross-sectionally substantially C-shaped frame sections (18, 19) each engaging with two opposite flanged edges (16, 16'; 17, 17') of the two glass panel receiving sections (13, 13') and adapted to be pressed away from one another by means of pressure elements (24).

8 Claims, 6 Drawing Sheets

COMPOSITE SECTION

BACKGROUND OF THE INVENTION

This invention relates to a composite section for manufacturing a case, in particular a show-case.

Sectional show-cases are known in many types in practice. They usually comprise four vertically placed uprights interconnected by upper and lower horizontal members. The connection of upper and lower horizontal members to an upright usually takes place by means of screws. For aesthetical reasons and also because the screws must not be accessible from the outside, each upright usually consists of a tubular section. The screws for connecting this tubular section to the upper and lower horizontal members should be fitted from the interior of the tubular section and only little space is available therefor, so that the assembly of the show-case is difficult and time-consuming. When this tubular section should in addition be provided on two side faces with glass panel receiving grooves, the result is a section that is difficult to manufacture by means of extrusion devices.

SUMMARY OF THE INVENTION

It is an object of the present invention to provide a composite section for manufacturing a show-case that can be made in a simple manner and be easily mounted, has a small transport volume and, moreover, meets high aesthetical requirements. The composite section according to the present invention is characterized to that effect by two identical, generally L-shaped glass panel receiving sections disposed in mirror-symmetrical relationship with the apices away from each other, the legs of the L having flanged edges defining an angle of at least 90°, said sections being interconnected by two cross-sectionally substantially C-shaped frame sections, each engaging with two opposite, flanged edges of the two glass panel receiving sections and adapted to be pressed away from one another by means of pressure elements.

In this manner, there is obtained a composite section whose components can be made in a simple manner and be mounted quickly, mainly because the four components telescope one, within the other.

To provide the C-shaped frame sections with a good grip in the angle included by a flanged edge of a section and the adjoining section leg, said angle preferably ranges between 45° and 60°, with the edges of the C-shaped frame sections having a cross-sectional profile matching this angle.

One of the C-shaped frame sections, i.e. the one which comes to lie on the exterior of the show-case, is preferably provided with blind holes which are uniformly interspaced, while the other C-shaped frame section is fitted with tapped holes having the same interspaces for receiving therein the bolts functioning as pressure elements.

BRIEF DESCRIPTION OF THE DRAWINGS

One embodiment of the composite section according to the present invention will now be described, by way of example, with reference to the accompanying drawings, in which.

DETAILED DESCRIPTION

Figure 1:
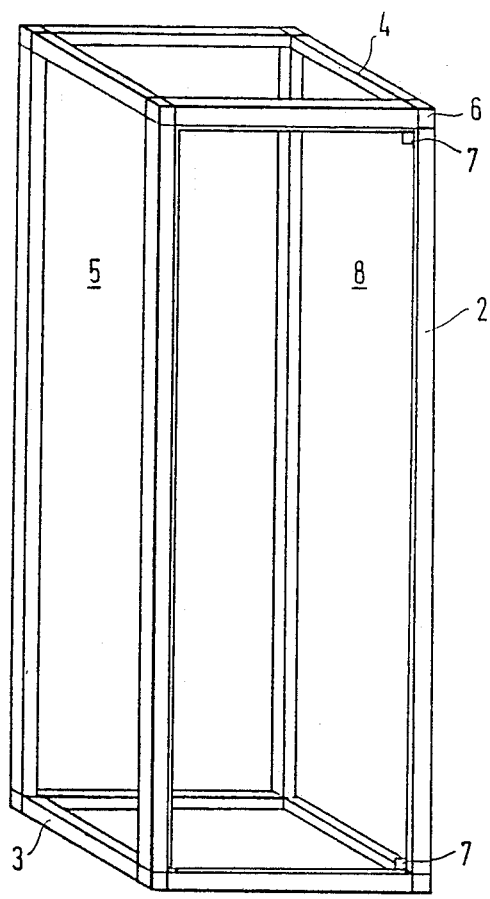
FIG. 1 is a perspective view of a show-case built up from composite sections.

FIG. 1 shows a show-case composed of four vertical uprights 2 placed at the corners and interconnected through bottom horizontal members 3 and top horizontal members 4. Composite sections (uprights) 2 and top and bottom horizontal members 3, 4 are identically composed of four interconnectable sections and provided with grooves for receiving a glass panel 5 therein. At 6 are illustrated corner joint members for coupling top and bottom horizontal members 3, 4 with uprights 2. At 8 is indicated a door suspended in the hinges 7.

Figure 2:
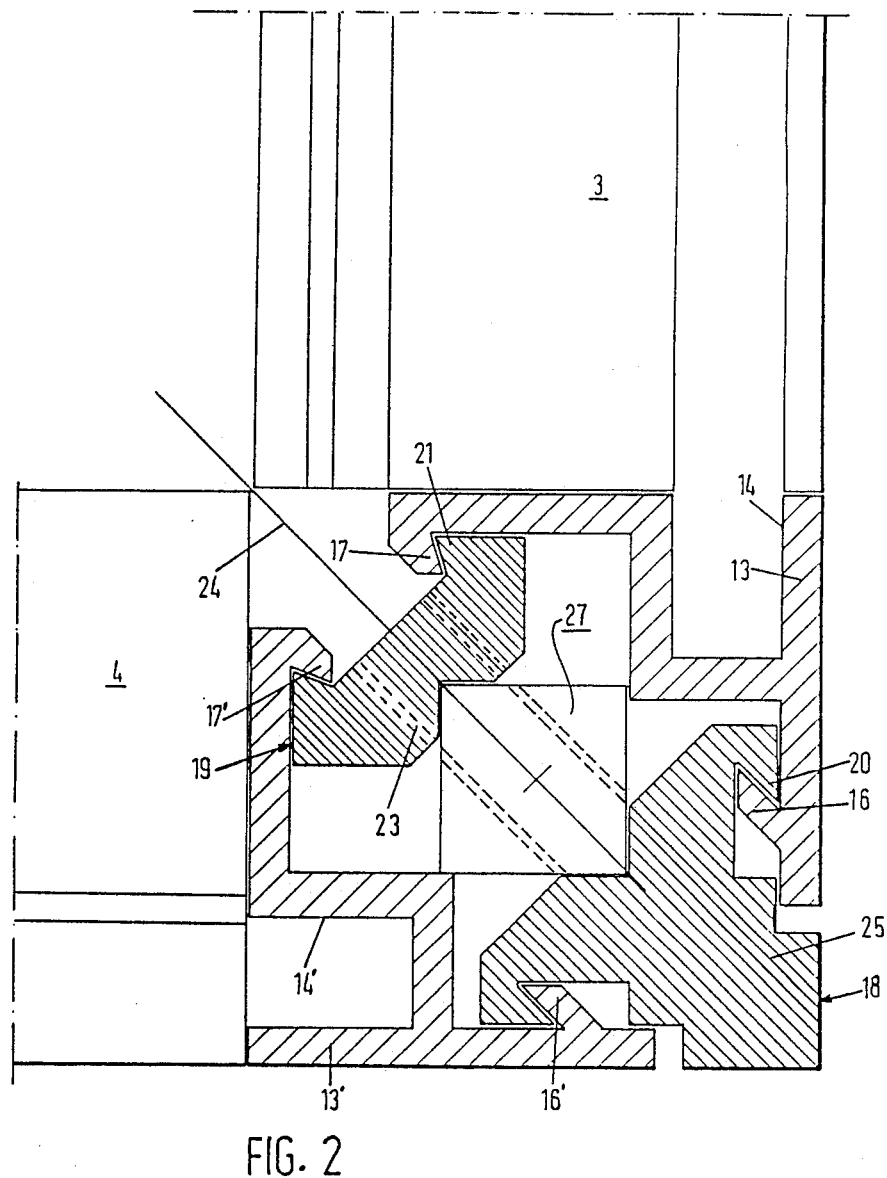
FIG. 2 is a cross-sectional view of a composite section.

FIG. 2 shows a composite section 2 in cross section, with a bottom horizontal member 3 and a top horizontal member 4 linking up with it. Composite section 2 comprises two identical, generally L-shaped sections 13, 13' placed in mirror-symmetrical relationship to one another, with the mirror plane extending according to the diagonal 24 of the composite section. One of the legs of the section 13, 13' contains a glass panel receiving groove 14, 14'. A flange 16 is provided on the leg of section 13 extending vertically in the drawing, said flange including with the vertical leg of the section an angle of 45°. The edge 17 of the horizontal leg of section 13 is flanged, thereby forming an angle of about 60° with respect to said horizontal section leg. The term "flanged" does not mean that the edge has been bent over to form the flange, but only refers to the shape of edge 17. Section 13, 13' will usually be made from e.g. aluminum or synthetic plastics, using an extrusion device.

The two sections 13, 13' are interconnected by cross-sectionally substantially C-shaped frame sections 18, 19. Frame section 18 is provided with two flanges 20 matching the angle between flange 16 and the adjoining leg of section 13. The edges 21 of frame section 19 are similarly adapted to the angle included by flange 17 with the other leg of section 13. Tapped holes 23 are provided at uniform interspaces in frame section 19, in which tapped holes 23 a screw (not specifically shown) can be screwed whose end comes to abut frame section 18. By tightening the screw, frame sections 18, 19 are pressed away from one another, so that sections 13, 13' are tensioned relative to one another, thereby producing a single rigid corner section composed of sections 13, 13' and frame sections 18, 19. The screws preferably have such a length that the ends directed towards the interior of the show-case come to lie within the space of the show-case, so that this screw end can be used as a support for the installation thereon of a shelf inside the show-case. The cross sectionally substantially C-shaped frame section 18 may be provided between the two edges 20 with a forwardly projecting portion 25 having such a shape that the free space between the ends of sections 13, 13' is filled up, thereby imparting an aesthetic outward appearance to the composite section 13, 13', 18, 19. This portion 25 may have a colour deviating from that of sections 13, 13', so that the appearance of the show-case can be embellished.

Figure 5:
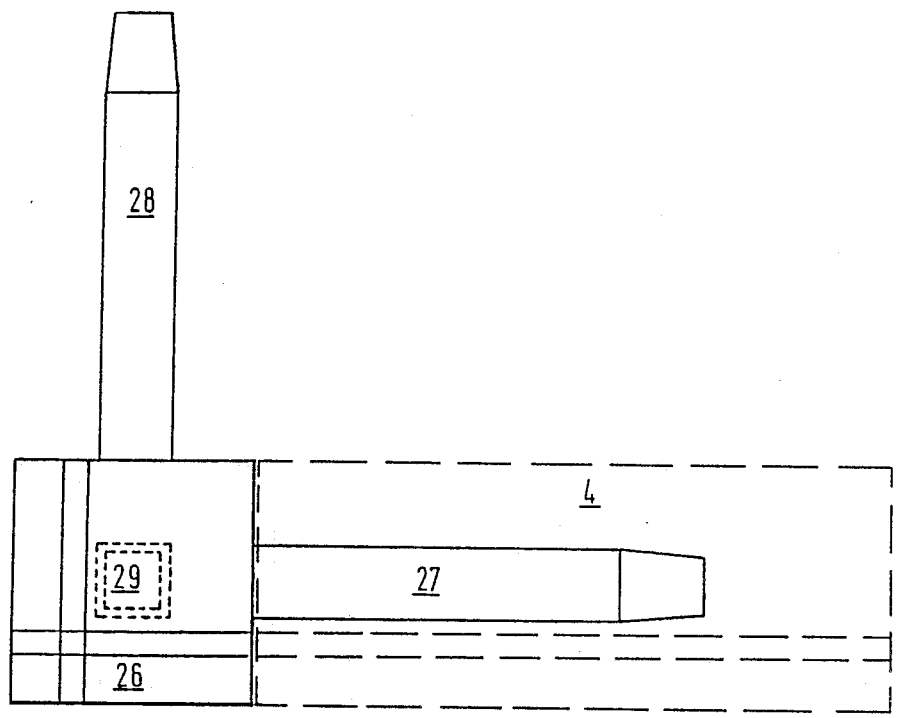
FIG. 5 shows a corner joint member.

Projecting between frame sections 18, 19 is a leg 27 of the corner joint member 6, shown in FIG. 5. This corner joint member consists of a cube 26 having three projecting legs 27, 28, 29 connected to the cubical body 26 so as to extend at right angles to each other. Naturally, grooves are provided in cubical body 26 which come to be co-extensive with the glass panel receiving grooves 14, 14' in sections 13, 13', allowing a glass panel to be received with its corner in the cubical body 26. The legs 27, 28 and 29 have through holes therein in such a place that the screw extending through frame sections 18, 19 can pass through one of the legs 27, 28, 29 of the corner joint member 6, so that said member 6 is coupled to the composite sections linking up therewith, as shown diagrammatically in FIG. 2.

Figure 3A:
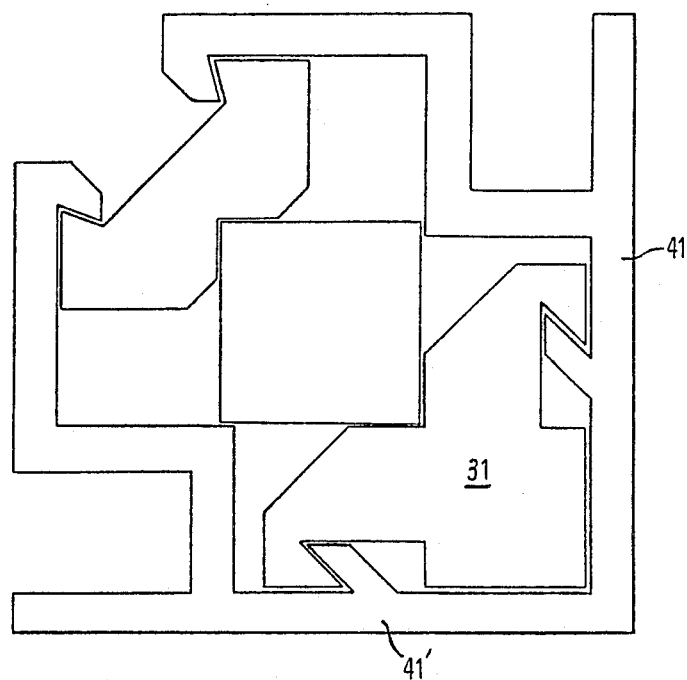
FIGS. 3a-c show variants of the composite section shown in FIG. 2, wherein the glass panel receiving sections include an angle of 90°.

FIGS. 3a, b and c show variants of the composite section according to FIG. 2. In these variants, sections 13, 13' and frame section 18 in FIG. 2 have a design differing from that shown therein. In FIG. 3a the legs of sections 41, 41' extend up to the corner, and frame section 31 has come to lie entirely within the right angle formed by the legs of sections 41, 41'.

Figure 3B:
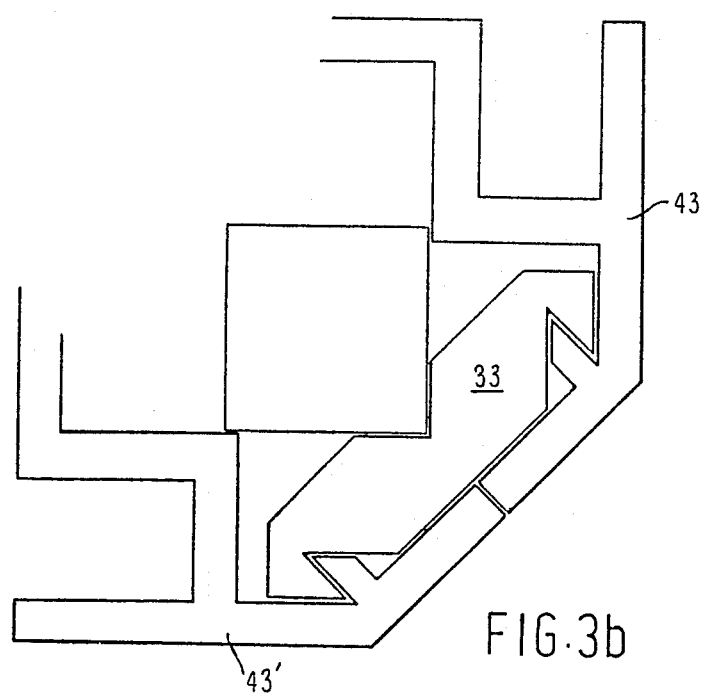
Figure 3C:
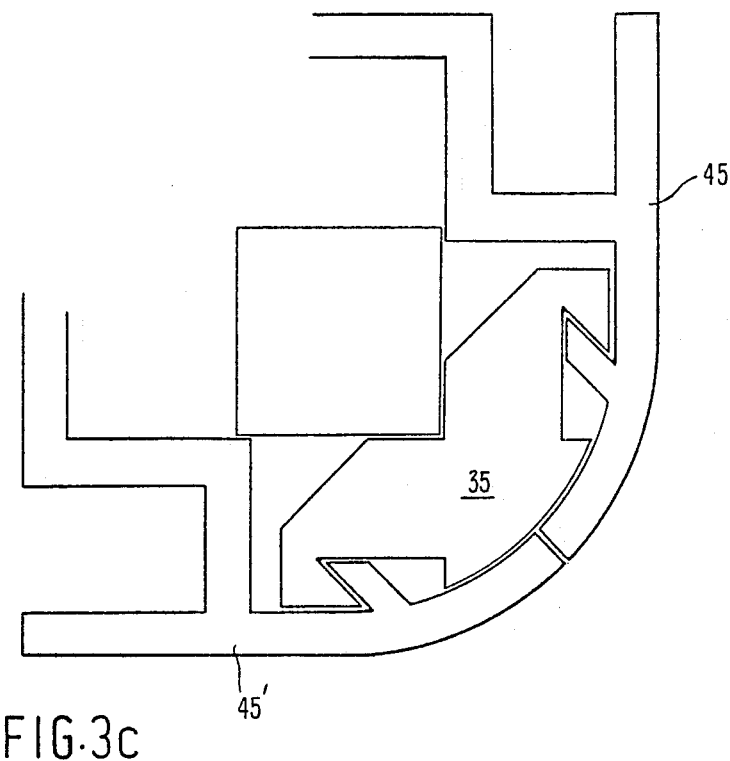

In the embodiment shown in FIG. 3b, the end of the legs of sections 43, 43' is flanged at an angle of 45° and frame section 33 is shaped to match this form. In FIG. 3c, the end of the legs of sections 43, 43' is of circular shape to produce a rounded corner. Frame section 35 is again shaped to match this form of sections 45, 45'.

Figure 4A:
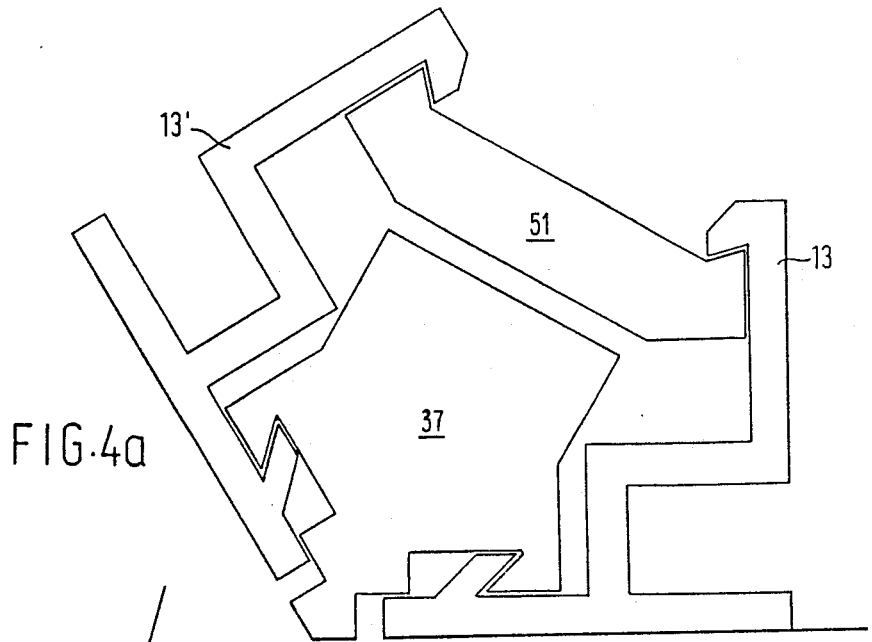
FIGS. 4a-b show variants of the composite section, wherein the glass panel receiving sections include an angle different from 90°.
Figure 4B:
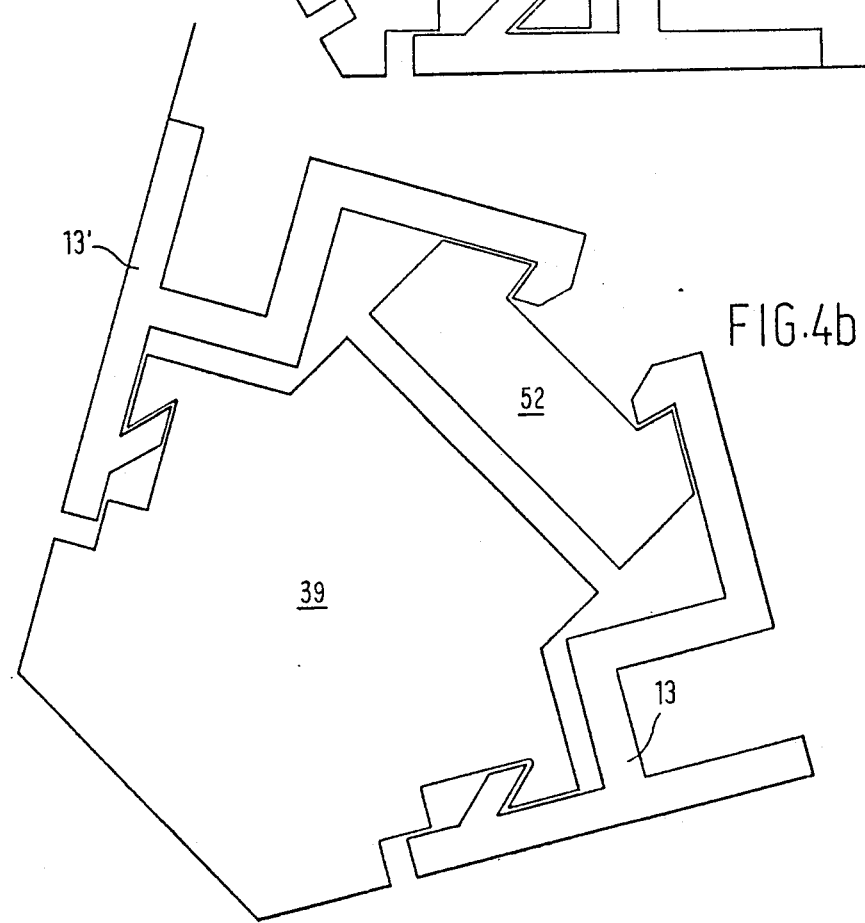

By imparting a different shape to frame sections 18, 19 shown in FIG. 2, the glass panels can be placed at an angle unequal to 90°. Two variants thereof are shown in FIGS. 4a–b. In the variant of FIG. 4a, two adjoining glass panels include an angle larger than 90°. Sections 13, 13' are identical to sections 13, 13' shown in FIG. 2. Only the shape of frame sections 37, 51 is changed from sections 18, 19 shown in FIG. 2.

In FIG. 4b, frame sections 39, 52 have yet another shape, which enables the glass panels received in sections 13, 13' to include an acute angle with each other.

It will be clear that in the embodiments shown in FIGS. 4a, 4b, the corner joint member shown in FIG. 5 should have an adapted form, so as to allow the top and bottom horizontal members 3, 4 to properly link up with the sectional uprights 2.

I claim:

1. A composite section for use in manufacturing a case comprising:

two identical first sections each having extended legs and U-shaped means for receiving a glass sheet, wherein said legs define a first angle of at least 90 degrees and each of said legs is provided with a first flanged edge so as to form a plurality of first flanged edges, each of said first flanged edges defining a second angle with an associated on of said legs of not greater than 90 degrees;

said first sections being placed in an opposing mirror symmetrical relationship with respect to each other and with apices of said first sections situated away from and opposing one another;

second sections interconnecting said first sections, wherein each of said second sections has two second flanged edges which engage with two opposing ones of said first flanged edges; and pressure means cooperating with each of said second sections for forcing said second sections away from each other.

2. The composite section as claimed in claim 1 wherein the first angle is between 45–60 degrees, and wherein each of the second flanged edges has a cross-sectional profile matching the second angle defined by a corresponding one of first flanged edges.

3. The composite section as claimed in claim 2 wherein one of the second sections has uniformly interspersed tapped holes for receiving screws therein, said screws being said pressure means and wherein ends of said screws abut against the other one of said second sections.

4. The composite section as claimed in claim 1 wherein one of the second sections has uniformly interspersed tapped holes for receiving screws therein, said screws being said pressure means and wherein ends of said screws abut against the other one of said second sections.

5. A show case composed of identical composite sections and corner joint members interconnecting the composite sections, each of said composite sections comprising:

two identical first sections each having extended legs and U-shaped means for receiving a glass sheet, wherein said legs define a first angle of at least 90 degrees and each of said legs is provided with a first flanged edge so as to form a plurality of first flanged edges, each of said first flanged edges defining a second angle with an associated one of said legs of not greater than 90 degrees;

said first sections being placed in an opposing mirror symmetrical relationship with respect to each other and with apices of said first sections situated away from and opposing one another;

second sections interconnecting said first sections, wherein each of said second sections has two second flanged edges which engage with two opposing ones of said first flanged edges; and pressure means cooperating with each of said second sections for forcing said second sections away from each other.

6. The show case as claimed in claim 5 wherein one of the second sections has uniformly interspersed tapped holes for receiving screws therein, said screws being said pressure means and wherein ends of said screws abut against the other one of said second sections.

7. The show case as claimed in claim 5 wherein the first angle is between 45–60 degrees, and wherein each of the second flanged edges has a cross-sectional profile matching the second angle defined by a corresponding one of first flanged edges.

8. The show case as claimed in claim 7 wherein one of the second sections has uniformly interspersed tapped holes for receiving screws therein, said screws being said pressure means and wherein ends of said screws abut against the other one of said second sections.

* * * * *

UNITED STATES PATENT AND TRADEMARK OFFICE
CERTIFICATE OF CORRECTION

PATENT NO. : 4,968,105

DATED : November 6, 1990

INVENTOR(S) : Petrus T. J. Schaars

It is certified that error appears in the above-identified patent and that said Letters Patent is hereby corrected as shown below:

ON TITLE PAGE:

Under the heading [73] Assignee, change "SDB Industries B.Y." to --SDB Industries B.V.--.

Signed and Sealed this

Twenty-fifth Day of February, 1992

Attest:

HARRY F. MANBECK, JR.

*Attesting Officer*  *Commissioner of Patents and Trademarks*